Nov. 11, 1958  M. A. PARSONS  2,859,886
WHEELED VEHICLE
Filed Sept. 16, 1954  2 Sheets-Sheet 1
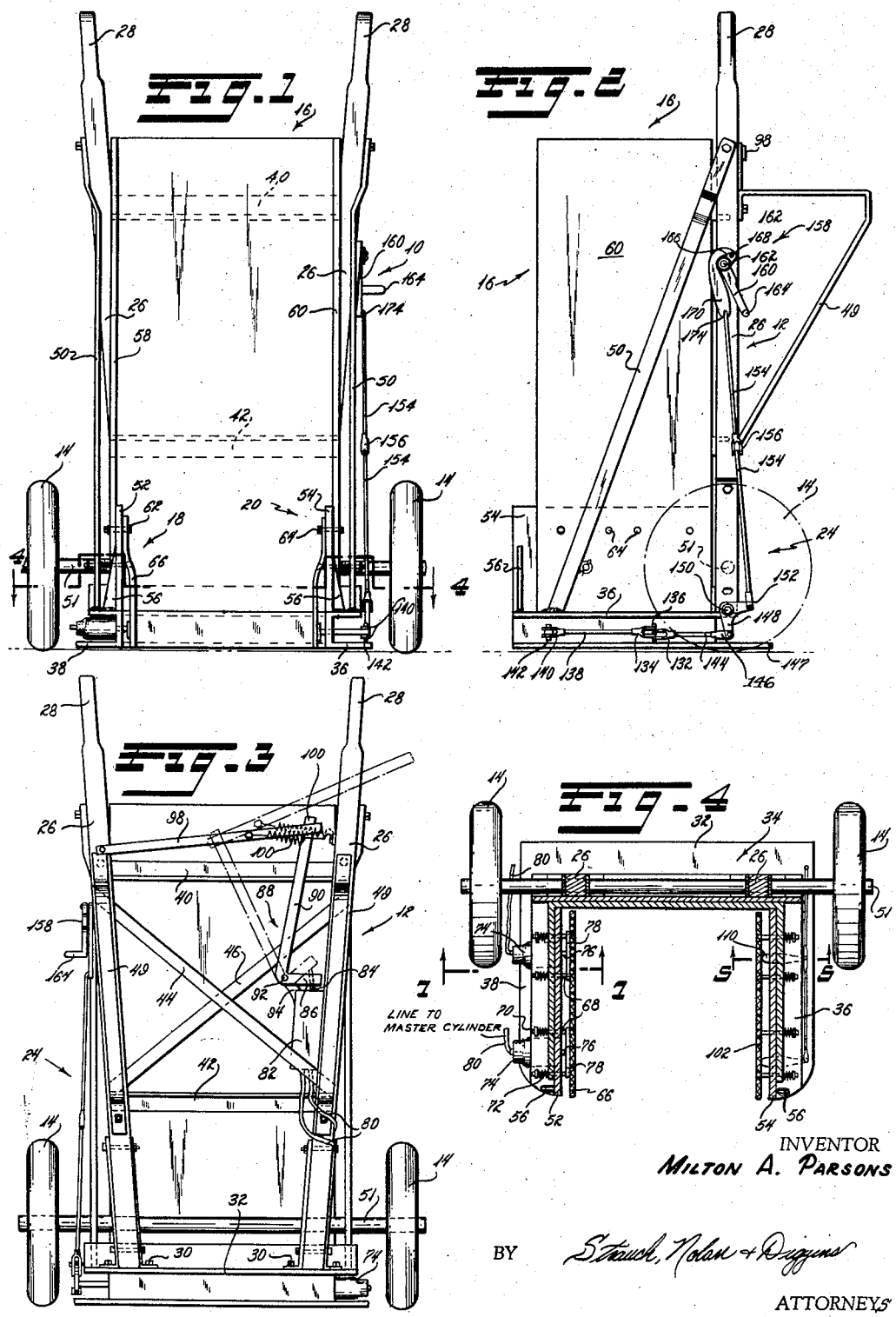
INVENTOR
MILTON A. PARSONS
BY
ATTORNEYS Nov. 11, 1958 M. A. PARSONS 2,859,886
WHEELED VEHICLE
Filed Sept. 16, 1954 2 Sheets-Sheet 2
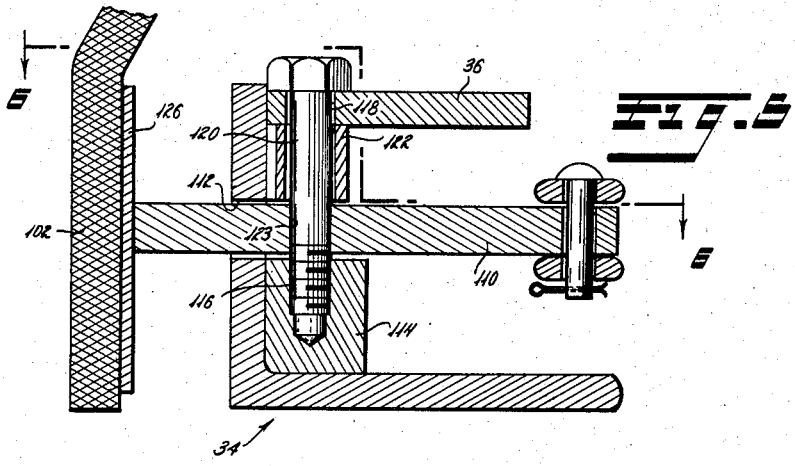
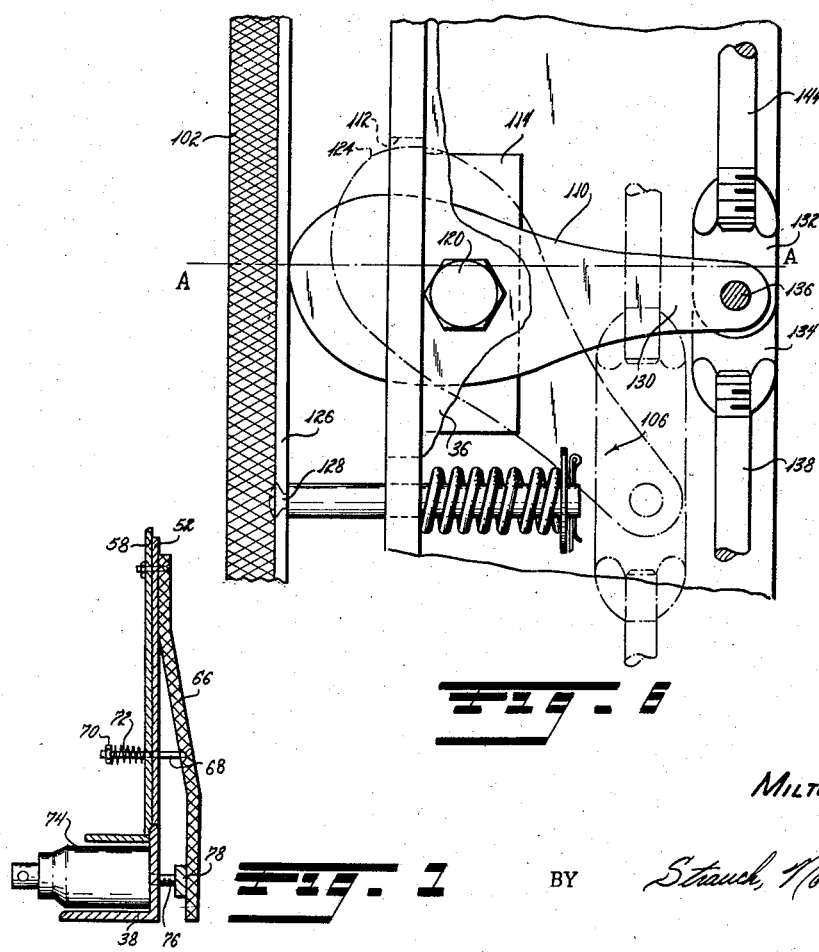
INVENTOR
MILTON A. PARSONS
BY
ATTORNEYS United States Patent Office 2,859,886
Patented Nov. 11, 1958

2,859,886

WHEELED VEHICLE

Milton A. Parsons, Nashville, Tenn.

Application September 16, 1954, Serial No. 456,410

6 Claims. (Cl. 214—377)

This invention relates generally to material handling and particularly to wheeled vehicles for picking up and transporting, intact, loads consisting of stacked bricks, masonry blocks and similar objects.

Broadly speaking, material handling trucks of the type contemplated by the present invention have been known for many years but their use has been limited by one or more characteristic disadvantages. One of these is the fact that most trucks of this general type and adapted to handle, for example, brick stacks utilize a plurality of spaced horizontal gripping tines or fingers to grasp the lowermost courses of the stack. Consequently, in order to be handled by these conventional trucks, the bricks must be stacked in a particular manner with the lower courses spaced to accommodate the gripping fingers. Furthermore, the fixed spacing of the gripping tines limits a particular truck to handling articles of a specific size, that is, a truck designed for bricks would not accommodate large masonry blocks.

It is, therefore, a primary object of the present invention to provide a novel versatile material handling truck which does not require special stacking of the loads to be handled and is not limited in use to loads comprised of units having specific dimensions.

A corollary object is the provision of material handling trucks with which the relative dimensions of the load and truck body are the only limitations on the type or size of the load which may be handled.

Because of the need in most conventional material handling trucks for a plurality of spaced load-gripping fingers and the presence of a plurality of movable gripping elements on opposed sides of said fingers, such trucks require relatively complex mechanisms for actuating said gripping elements in unison. Consequently, such trucks are usually characterized by a high initial cost, are bulky, cumbersome and prone to become out of order, and require considerable maintenance and servicing. As a matter of fact, the weight and bulk of the gripping mechanism is usually such that practically all brick trucks of this type are four-wheeled, power-driven vehicles similar to industrial fork trucks.

It is, therefore, another important object of the present invention to provide simple, inexpensive, light weight material handling truck, particularly of the two-wheeled manually motivated and operated, tiltable-body type.

Some material handling trucks have evolved in the development of the handling art which do not utilize a plurality of spaced, parallel load-gripping fingers but these too have characteristic disadvantages. For example, some require special frames in which the load is stacked prior to being picked up, frame and all, by the truck. Others require special demountable reaction members to provide a surface against which the load is forced in picking it up. These reaction members must be locked in place after the load is enveloped and before actuating the gripping mechanism.

Accordingly, it is a further object of the invention to provide a novel material handling truck capable of gripping, transporting and releasing a load of stacked objects intact, without special frames or detachable reaction members.

Another object is the provision of a novel two-wheel material handling truck tiltable about the wheel axis and including a channel-shaped body and means for releasably clamping a load of stacked bricks or like articles therein.

Still another object is the provision of an improved channel-body material handling truck for transporting stacked objects having novel hydraulically powered load gripping means.

A further object is to provide an improved brick truck in which the effective width of the truck body at the load gripping means may be adjusted to accommodate loads of different widths.

These and other objects, the manner of their accomplishment and the advantages of the invention will be readily apparent to those conversant with the art from the following description of a preferred embodiment of the invention, read in conjunction with the subjoined claims and annexed drawings, in which, Figure 1 is a front elevational view of a material handling truck according to the present invention;

Figure 2 is a side elevational view of the brick truck shown in Figure 1;

Figure 3 is a rear elevational view of the brick truck shown in Figure 1;

Figure 4 is a sectional view on line 4—4 of Figure 1, looking in the direction of the arrows;

Figure 5 is a sectional view on line 5—5 of Figure 4, looking in the direction of the arrows;

Figure 6 is a sectional view on line 6—6 of Figure 5, looking in the direction of the arrows; and Figure 7 is a sectional view on line 7—7 of Figure 4, looking in the direction of the arrows.

Referring to the drawings in which like parts are designed by like numerals of reference through the several views and first, in particular, to Figures 1, 2 and 3, a preferred embodiment of the invention is the material handling truck indicated by numeral 10.

Truck 10 comprises, as its basic components, a frame 12; a pair of ground engaging wheels 14 rotatably mounted adjacent the lower end of and on each side of the frame; a channel-shaped body 16 mounted on and securely fastened to the frame; a load gripping assembly 18 on one side wall of the body 16 adjacent its lower end; an adjustment assembly 20 for varying the effective width of the body 16 to accommodate the load; a hydraulic operating mechanism 22 for actuating load gripping assembly 18; and an operating mechanism 24 for the adjustment assembly 20.

As best seen in Figures 2 and 3, frame 12 is made up of a pair of side rails 26 having handles 28 at their upper ends and having their lower ends secured in suitable manner, for example, by bolts 30 to the rear leg 32 of a base frame member 34. The base frame member 34 has, in addition to rear leg 32, a pair of side legs 36 and 38 extending forwardly from and at right angles to the rear leg. To provide strength and rigidity and convenient means for mounting elements of assemblies 18 and 20, legs 32, 36 and 38 may be formed of channels. Thus the base frame 34 and side rails 26 give the frame 12 as a whole an L-shaped configuration when viewed in side elevation, Figure 2.

Side rails 26 are rigidly interconnected by a pair of parallel cross-members 40 and 42 and may be further tied together and reinforced by diagonal braces 44 and 46. Additional structural members may be used if necessary to give the frame sufficient mechanical strength and rigidity.

Wheels 14 are rotatably mounted adjacent the bottom, rear portion of frame 12 on an axle 46 extending through suitable, transversely aligned bores in side rails 26. As best appears in Figure 2, the axle 51 is so located that the lower portions of the periphery of wheels 14 extend slightly beyond the bottom of base frame member 34, so that the truck can be rolled in a vertical position on wheels 14 when approaching the load. The lower rear edge of base frame rear leg 32 has a projection 47 which projects slightly beyond the wheels 14 to contact the ground and thus prevent the wheels from rolling backwardly until the center of gravity of the truck has passed over the axle.

A pair of support legs 49 are secured to the back sides of rails 16 to provide supports for the truck and load when tilted back to a horizontal position, in which position legs 49 contact the ground and, in cooperation with wheels 14 provide a stable, four point support base for the truck and its load. A pair of parallel braces 50 extend from the upper portions of side rails 26 to the forward ends of base member side legs 36 and 38.

On top of and flush with inner surfaces of side legs 36 and 38 are mounted backing plates 52 and 54 rigidly secured to the side legs as by welding and reinforced by suitable means such as webs or fillets 56. Channel-shaped body 16 is rigidly mounted on and secured to frame 12 with its bottom edges resting on the top surfaces of legs 32, 36 and 38 of base frame member 34 as by welding, bolting or the like. As shown in Figure 1, the bottom portions of side walls 58 and 60 of body 16 are disposed in surface contact with the outer surfaces of backing plates 52 and 54, respectively, and are secured thereto by rows of nut and bolt assemblies 62 and 64 which also serve to mount members of the gripping assembly 18 and adjustment assembly 20 as will now be described.

Referring to Figures 1 and 7, load gripping assembly 18 comprises a grippinug member 66 formed of a substantially rectangular strip of tough, flexible, durable material such as, for example, ¼-inch corded belting. Gripping member 66 is secured along its upper edge portion to the inner face of backing plate 52 by the bolt assemblies 62 so that its bottom edge is free and extends substantially to the bottom face of base frame member 34. A plurality of spaced, headed studs 68 having their heads embedded flush with the inner surface of gripping member 66, extend through the member, and freely through suitable holes in backing plate 52 and body side wall 58 as best appears in Figure 4. The outer ends of studs 68 are threaded and carry nuts 70 serving as abutments for compression springs 72 encircling the studs and bearing against the outer surface of body side wall 58, thus resiliently biasing gripping member 66 outwardly toward a normal, load-releasing position adjacent its backing plate 52. Four biasing assemblies 68, 70, 72 are shown but it will be understood that any appropriate number can be used.

Gripping member 66 is forcibly moved inwardly or away from back plate 52 to a load gripping position by a hydraulic operating system 22 which includes a pair of hydraulic slave cylinders 74 mounted in any suitable manner within the channel of leg 38 of base frame 34. Conventionally, slave cylinders 74 contain fluid operated pistons, not shown, the rods or stems 76 of which extend perpendicularly through the web of leg 38 and carry bearing plates 78 contacting and, if desired, secured to the outer face of gripping member 66. Thus piston rods 76 and plates 78 force gripping member 66 inwardly upon supply of pressure fluid to cylinders 74.

Pressure fluid lines 80 extend from slave cylinders 74 and are connected with a master cylinder 82, suitably mounted on side rail 26 of frame 12. Master cylinder 82 contains a piston, not shown, having a piston rod or stem 84 extending upwardly out of the cylinder. The free end of stem 84 is pivotally connected to the free end of one leg 86 of a bell crank lever 88.

The bell crank 88 has a second leg 90 extending at substantially right angles to the leg 86 and is pivotally mounted at 92 on a bracket 94 provided on the housing cylinder 82. A suitable connection is provided between the leg 86 and the piston stem 84 so that upon movement of the crank 88, the piston stem moves linearly.

The free end of leg 90 of bell crank 88 is pivotally connected at 96 to one end of an operating lever 98 which extends generally transversely of the truck 10 and at right angles to leg 90 when the linkage is in load gripping position as shown in solid lines, Figure 3.

In order to actuate the operating lever 98 to compress the piston of the cylinder 82 and thus actuate the cylinders 74 to grip the load, a heavy spring 100 is connected at one end to the operating lever 98 at a pivot 97 spaced some distance from the pivot point 96 and at its other end to a rail 26 below the horizontal plane of the pivot point 96. To operate the piston in cylinder 82, the lever 98 is swung counterclockwise to the full line position shown in Figure 3 until its end rests upon the support member 49. This stresses the spring 100 which pulls the leg 90 of the bell crank lever 98 and the operating handle 99 clockwise to apply pressure to the fluid in the cylinder 82 and to maintain the pressure. With the levers 98 and 88 in this position, the piston in master cylinder 82 forces out working fluid through conduits 80 jointly energizing slave cylinders 74 to force piston rods 76, and therefore gripping member 66 inwardly to grip the load. It will be understood that the ratio of the piston areas of master cylinder 82 and slave cylinders 74 are selected to give the desired force multiplication.

When the load is to be released, the operating handle 99 is swung clockwise which relieves the tension on the spring 100 and the bell crank lever 88 is free to swing counterclockwise and relieve pressure in the cylinder 82.

Inasmuch as the extent of movement of load gripping member 66 is limited by practical considerations, an adjustment assembly 20 is provided which gives the truck greater latitude in handling loads of different widths.

As shown in Figures 1 and 4, assembly 20 comprises an adjustment member 102 which corresponds structurally to gripping member 66, being secured to backing plate 54 by nut and bolt assemblies 64 and biased outwardly or toward the backing plate 54 by biasing assemblies 104, all in a manner wholly analogous to member 66. Biasing assemblies 104 comprise cotter pin and washer assemblies 106, Figure 6, serving the function of abutments for biasing springs 108 in place of nuts 70 of gripping assembly 18. It will be understood that either nuts or the cotter pin and washer means can be used in either or both the gripping assembly 18 and adjustment assembly 20.

Adjustment member 102 is forcibly moved inwardly by a pair of identical cams 110 and 111, the former being shown in detail in Figures 5 and 6, pivotally mounted in leg 36 of base member 34 as will now be described. Inasmuch as the cams are identical only cam 110 will be described in detail.

For each cam 110 and 111, the web of channel section leg 36 is provided with an elongated, substantially rectangular slot 112, providing ample operating clearance for the cam. At the juncture of the web and lower side of leg 36 and extending nearly the entire length of slot 112 is provided a boss 114 having a planar upper surface flush with the lower edge of the slot and a threaded bore 116 coaxially aligned with a slightly larger untapped hole 118 in the upper side of leg 36. Cam 110 freely extends through slot 112 and is pivotally secured in position by a pivot bolt 120 extending through hole 118, a tubular spacing sleeve 122, a similar hole 123 in the central area of the cam and threaded into tapped bore 116.

As best appears in Figure 6, cam 110 has a generally asymmetrical tear drop configuration with a smoothly curved forward end or nose 124 forming the active profile and being adapted to contact a bearing surface such as a steel plate 126 secured to the outer surface of adjustment member 102 as by rivets 128 or like means.

Cam-nose 124 is eccentric to cam pivot 120 and therefore rotational movement of the cam forcibly moves member 102 away from leg 36 or allows it to return under the influence of biasing assemblies 106.

The end of cam 110 opposite nose 124 comprises an extension 130, the free end of which is pivotally connected to a pair of oppositely disposed clevises 132 and 134 by a single clevis pin 136, see Figure 2. A rod 138 threaded on clevis 134 at one end carries a clevis 140 at its other end which is pivotally connected to cam 111 by clevis pin 142.

A rod 144 having one end threaded in clevis 132 carries a clevis 146 at its opposite end pivotally connecting it to one arm of a bell crank 148 pivotally mounted as at 150 adjacent the juncture of side rail 26 with base frame 34. The other arm of bell crank 148 has pivotally connected thereto the lower end of a connector rod 154, articulated substantially midway between its ends by a pin and clevis connection 156 having its pivotal axis at right angles to that of clevis 152 thereby imparting maximum flexibility to the linkage.

A toggle action lever assembly 158 for operating the adjustment assembly 20 is mounted in a convenient position on side rail 26 within easy reach of the operator and consists of a lever 160 having one end pivotally mounted as at 162 on a rail 26 and having a handle 164 (Figure 3) on the other end. The lever 160 has a short arm 166 and which is pivotally connected at 168 to the upper end of a toggle link 170 having a concavely curved portion 172 for a purpose presently appearing. The lower end of link 170 is pivotally connected at 174 to the upper end of articulated rod 154.

From the structure thus far described it will be seen that rotation of lever 160 clockwise in Figure 2 moves articulated rod 154 upwardly, rotates bell crank 148 counterclockwise, pulls rods 144 and 138 rearwardly, i. e., to the right in Figure 2, jointly pivoting cams 110 and 111 counterclockwise as viewed in Figure 6 from the broken line position, in which biasing assemblies 104 hold adjustment member 102 in its limit position closest to leg 36, to the solid line position, in which the cams move member 102 inwardly away from leg 36 to its opposite, that is, inner limit position. Counterclockwise movement of lever 160 reverses the action of the linkage and returns cams 110 and 111 to their respective dotted line positions in obvious manner.

Biasing assemblies 104 act continuously to move member 102 toward leg 36 of base frame 34 and into contact with cams 110 and 111. Cams 110 and 111 are so curved and the adjustment linkage as a whole so adjusted that the force of biasing assemblies 104 and the force exerted by the load gripping assembly 18 is transmitted through the cams along a line "a" (Figure 6) which is to one side of the cam pivot 120 so that the cams are constantly biased in a clockwise direction or toward the released position. In consequence the cam operating linkage is biased toward released position placing rods 138, 144 and 154 under tension. As a result when lever 160 is being moved counterclockwise (Figure 2) to adjust cams 110 and 111 to full line positions (Figure 6) this is done against the force of biasing assemblies 104 until pivot point 168 passes over the center of pivot point 162, whereupon the tension in rods 154 completes the clockwise movement of the lever and locks the lever in its full line position, regardless of outwardly directed forces applied to member 102. The same toggling action occurs when the lever 160 is moved counterclockwise and it will be seen that the purpose of curve 172 on link 170 is to accommodate pivot 162 when lever 160 is moved to the clockwise limit position.

From the structure and operation of the various subcombinations described above it will be understood that the use and operation of the truck as a whole is as follows:

When the truck is empty, operation handle 98 of the gripping mechanism is normally in its dotted line position so that gripping member 66 is in load releasing position and adjustment handle 160 is in its counterclockwise limit position so that adjustment member 102 is in its outermost position next to backing plate 54 and leg 36 of base frame 34. In this condition, the truck is wheeled to the load to be handled, for example, a stack of bricks, masonry blocks, a box, or the like and maneuvered into position so that when the truck is elevated to a vertical position, the channel-shaped body 16 will surround the load on three sides. If the width of the load is considerably smaller than the breadth of body 16, lever 160 is moved to its clockwise position which, as explained above, moves adjustment member 102 inwardly to decrease the effective breadth of the body 16. If the load is wide enough, this operational step is omitted. With the truck in position, then, lever 98 is swung to its solid line position so that gripping member moves inwardly and forces the lower part of the load against the adjustment member 102 forming a rigid platform to support the remaining upper part of the load. The hydraulic force exerted by the gripping assembly 20 is a function of the hydraulic piston area, the leverage provided by linkage 88, 90, 86 and the tension of spring 100.

With the load thus firmly gripped, the truck is tilted back so that the load, particularly the loose or ungripped upper portion is cradled in the channel, and then wheeled to its destination, where by reverse procedure the load is deposited intact, in its original condition.

While the linkage for maintaining and releasing pressure in the master cylinder 82 and slave cylinders 74 is preferable because of its ruggedness and simplicity, this pressure can also be maintained and released by suitable valves located in the fluid line between the master and slave cylinders. If desired a single combined check and release valve may be used or separate check valves and release valves may be used. The construction of the valves is not a part of this invention and any suitable known valves may be used. When the pressure is controlled by valves, the arm 98 and spring 100 are omitted.

From the foregoing description it will be understood that handling means have been provided fulfilling the object of the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hand truck comprising a frame; a pair of spaced parallel legs attached to said frame; a pair of ground engaging wheels mounted on said frame adjacent said legs for rotation about an axis perpendicular to said legs; a gripping member on the inner surface of one of said legs; means selectively operable to move said gripping means toward and away from the other leg; an adjustment member on the inner surface of said other leg directly opposite said gripping member; and means selectively operable to move said adjustment member toward and away from said gripping member and independently thereof; said last named means comprising means resiliently biasing said adjustment member away from said gripping member; at least one cam mounted on said frame for pivotal movement to and from a first position in which it positively moves said adjustment member toward said gripping member against the influence of said biasing means and a second position in which it allows said biasing means to move said adjustment member away from said gripping member; and an over-center toggle action mechanism operatively connected to said cam and manually operable to move said cam to and from said first and second position.

2. The hand truck defined in claim 1 wherein said means selectively operable to move said gripping member comprises means resiliently biasing said gripping member away from said adjustment member; a hydraulic system including slave piston and cylinder assemblies operatively connected to said gripping member and a master cylinder and piston assembly operatively connected to said slave piston and cylinder assembly and an over-center toggle action linkage operatively connected to actuate said hydraulic system and in one position move and hold said gripping means toward said adjustment member and in a second position allow said gripping means to move away from said adjustment member under the influence of said biasing means.

3. In a hand truck, a U-shaped base frame comprising a rear leg and a pair of side legs connected at right angles to the respective ends of said rear leg; a pair of spaced side rails each connected at one end to said rear leg in a plane substantially perpendicular to said base frame; a three-sided channel-shaped body, having a pair of substantially parallel side walls perpendicular to a third wall, secured to said base frame and side rails with said side walls perpendicular to said base frame and supported at one end on the side legs thereof and said third wall adjacent said side rails; a pair of ground engaging wheels mounted on said side rails adjacent said base frame for rotation about an axis parallel to the rear leg thereof; a planar gripping member mounted on the inner surface of one of said body side walls adjacent said base frame for swinging movement toward and away from said one body side wall about an axis generally parallel to the base frame side leg on which said one side wall is supported; means normally biasing said gripping member towards said one body side wall; a planar adjustment member mounted on the inner surface of the other of said body side walls and directly opposite said gripping member for swinging movement toward and away from said other body side wall about an axis generally parallel to the other of said base frame side legs; means normally biasing said adjustment member toward said other body side wall; adjustment means selectively operable to move said adjustment member against the influence of said biasing means to decrease the distance between said adjustment member and gripping member; and means selectively operable independently of said adjustment means forcibly to move said gripping member away from said one base frame side leg to grip a load between said gripping member and said adjustment member.

4. In a hand truck as defined in claim 3, said adjustment means comprising a plurality of cams pivotally mounted at spaced points on said other base frame side leg for rocking movement about respective parallel axes perpendicular to said side leg, and effective upon being rocked in one position to swing said adjustment member away from said other side wall; and a two-position toggle action mechanism operatively connected to said cams and operative upon movement to one position jointly to pivot said cams to said one position and upon movement to a second position to pivot said cams jointly away from said one position.

5. In a tiltable hand truck having a pair of ground engaging wheels at one end the axis of rotation of which defines the tilting axis of said truck, a three-sided channel shaped body adapted to surround a load on three sides and having its longitudinal plane of symmetry substantially perpendicular to said tilting and wheel axis; said three-sided channel shaped body having a back member parallel to said axis of rotation, a first side member attached to said back member substantially normal thereto adjacent one of said wheels, and a second side member attached to said back member adjacent the other wheel; load engaging members movably mounted on the inner surfaces of said side members adjacent said one end of the truck for independent movement toward and away from each other; said load engaging members defining a free space therebetween to receive a load; adjustment means selectively operable to move said load engaging member on said first side member toward the other to adjust the distance therebetween to the corresponding dimension of the load to be gripped; means resiliently urging said load engaging member on said first side member toward said side member; and load gripping means selectively operable independently of said adjustment means to move the load engaging member on said second side member toward the other load engaging member to grip a load therebetween; said adjustment means including a toggle action linkage automatically operative upon movement of said load engaging member on said first side member toward the other member to lock said load engaging member on said first side member against opposite movement until positively released by reverse movement of said linkage.

6. In a tiltable hand truck having a pair of ground engaging wheels at one end of the axis of rotation of which defines the tilting axis of said truck, a three-sided channel shaped body adapted to surround a load on three sides and having its longitudinal plane of symmetry substantially perpendicular to said tilting and wheel axis; said three-sided channel shaped body having a back member parallel to said axis of rotation, a first side member attached to said back member substantially normal thereto adjacent one of said wheels, and a second side member attached to said back member adjacent the other wheel; load engaging members movably mounted on the inner surfaces of said side members adjacent said one end of the truck for independent movement toward and away from each other; said load engaging members defining a free space therebetween to receive a load; adjustment means selectively operable to move said load engaging member on said first side member toward the other to adjust the distance therebetween to the corresponding dimension of the load to be gripped; means resiliently urging said load engaging member on said first side member toward said side member; and load gripping means selectively operable independently of said adjustment means to move the load engaging member on said second side member toward the other load engaging member to grip a load therebetween; said load gripping means including a toggle action linkage automatically operative upon movement of the load engaging member on said second side member toward the other load engaging member, to lock the load engaging member on said second side member against opposite movement until positively released by reverse movement of said linkage.

References Cited in the file of this patent

UNITED STATES PATENTS

| | | |
|---|---|---|
| 835,376 | Stewart | Nov. 6, 1906 |
| 976,393 | Penfield | Nov. 22, 1910 |
| 1,220,505 | Eggers | Mar. 27, 1917 |
| 1,299,447 | Fontaine | Apr. 8, 1919 |
| 1,795,856 | Gravatt | Mar. 10, 1931 |
| 2,213,629 | Fontaine | Sept. 3, 1940 |
| 2,247,168 | Fontaine | June 24, 1941 |
| 2,292,605 | Brase | Aug. 11, 1942 |
| 2,316,938 | Dimick | Apr. 20, 1943 |
| 2,468,999 | Pettler | May 3, 1949 |
| 2,485,545 | Bishop | Oct. 25, 1949 |
| 2,667,283 | MacDonald et al. | Jan. 26, 1954 |
| 2,684,772 | Cartwright | July 27, 1954 |